Sept. 23, 1947.       F. C. MELCHIOR        2,427,972
SELF-ENERGIZING AIRFOIL
Filed Feb. 1, 1944         2 Sheets-Sheet 2
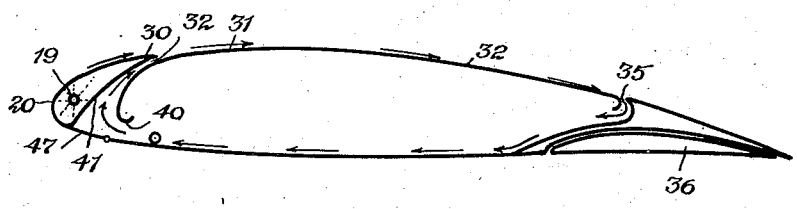
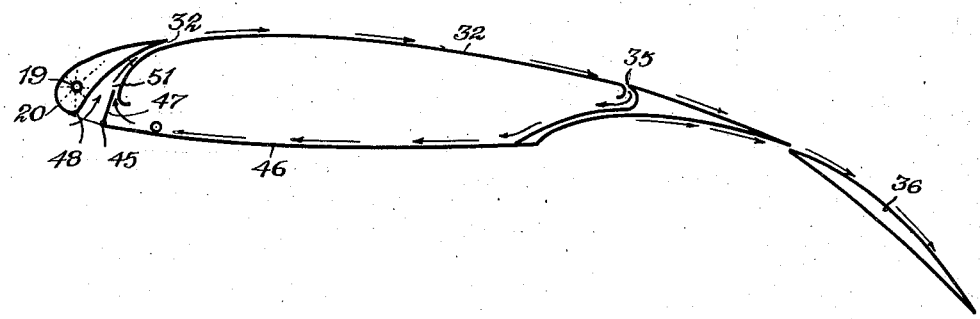
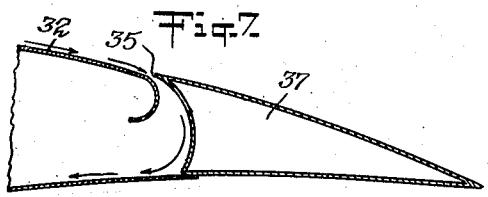 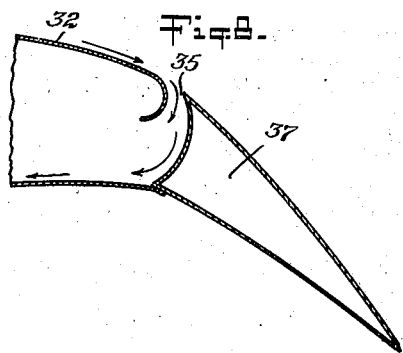
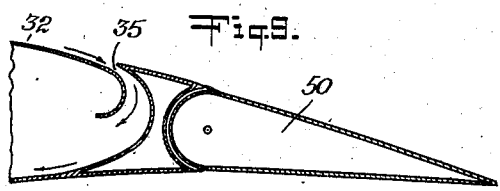
INVENTOR.
Frederick C. Melchior
BY
Attorneys Patented Sept. 23, 1947

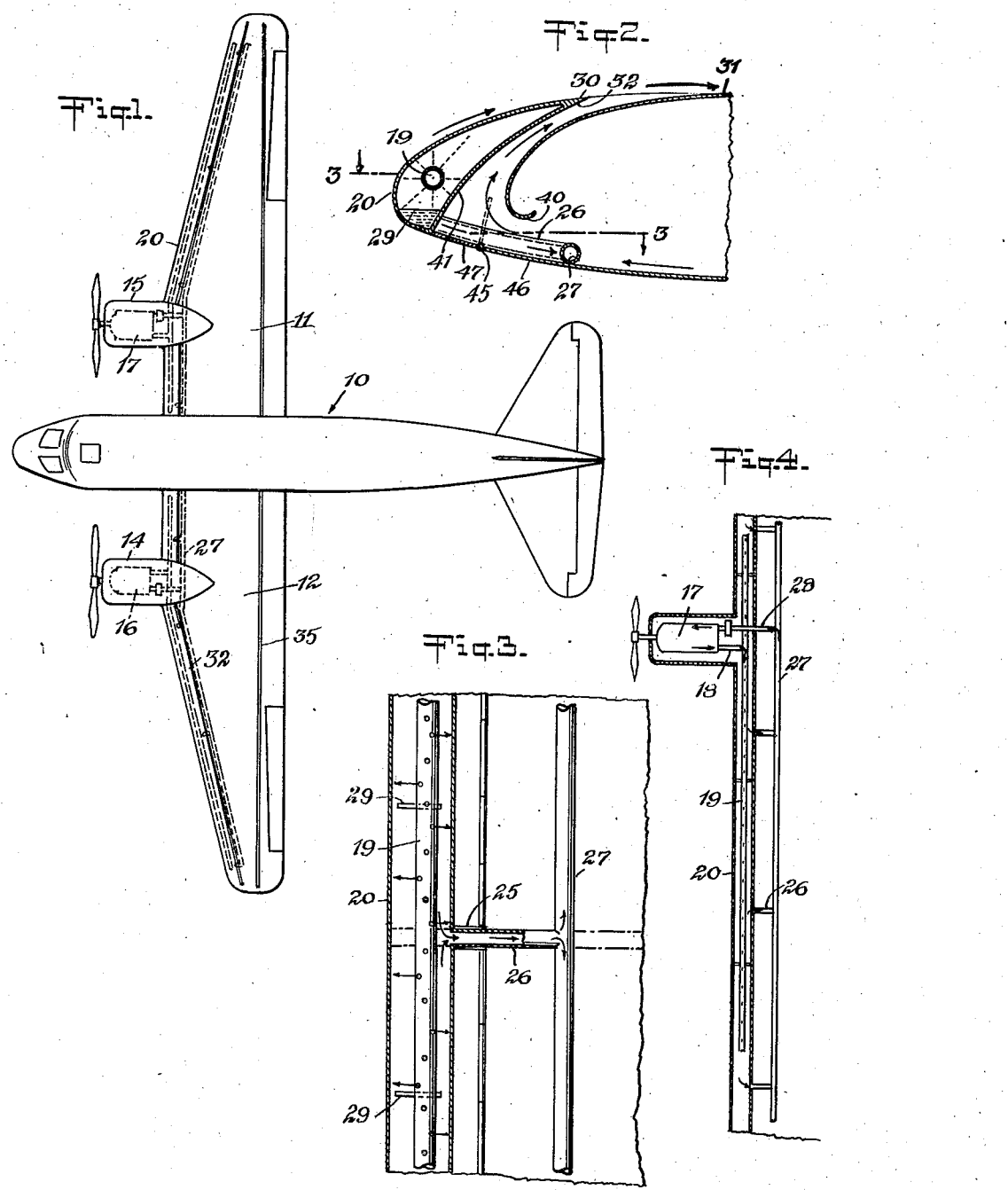

2,427,972

UNITED STATES PATENT OFFICE 2,427,972

SELF-ENERGIZING AIRFOIL

Frederick C. Melchior, New York, N. Y.

Application February 1, 1944, Serial No. 520,628

4 Claims. (Cl. 244—40)

This invention relates to aircraft and more particularly to a self-energizing airfoil adapted for use on various types of airplanes. The invention relates to improvement in aerodynamic efficiency of aircraft and more particularly the structure governing the character of the laminar flow about the airfoil or section of the wing. It also relates to an improved method of incorporating in such an airfoil means for using and disposing of waste heat from the power plants of the aircraft.

An object of the invention is to cause through Venturi action back suction on the boundary layer of air on the top surface of the wing increasing its velocity and improving the lift characteristics of the wing.

A further object is to provide means to sustain normal laminar flow over the wing at very high angles of attack, such as in landing, and by back suction remove the burbling point and prevent the formation of eddies, thus increasing the maximum lift coefficient.

Another object of the invention is to provide means for dissipating engine waste heat in a most efficient manner without adding parasitical weight or resistance.

A still further object of the invention is to provide means which efficiently use the waste heat from a power plant either by means of using the exhaust gases or by absorbing the heat from the coolant in liquid cooled engines and eliminating the need for the normal heavy and objectionable radiator.

An additional object resides in the utilization of the waste heat in heating the wing and thus preventing icing and other undesirable conditions caused by the weather.

Other objects and advantages of my invention will appear from the accompanying drawings and description in which I illustrate only one embodiment thereof although I disclose the broad principles involved.

In the accompanying drawings—

Figure 1 is a plan view of a plane embodying my invention;

Fig. 2 is a cross sectional view of the leading edge of a wing embodying one form of my invention;

Fig. 3 is a detailed plan view taken on the line 3—3 of Fig. 2;

Fig. 4 is a diagrammatic view showing the manner in which my invention may be applied to the leading edge of a wing;

Fig. 5 is a transverse view of an airfoil embodying my invention and provided with Fowler flaps, the view showing the airfoil in the position of normal flight;

Fig. 6 is a view of the same airfoil during high angles of attack such as in landing;

Fig. 7 is the sectional view of the trailing edge of an airfoil embodying my invention;

Fig. 8 is a view of the same airfoil;

Fig. 9 is a sectional view of a conventional flap applied to a wing embodying my invention.

In the accompanying drawings I have shown my invention applied to a liquid cooled engine in which the cooling liquid is used as a medium for heat transfer. However, it is within the scope of my invention to employ an exhaust boiler to be used with air cooled engines as well, and to use the heat from the exhaust pipe or an exhaust boiler similar in principle to heat transfers apparatus shown in Patent No. 2,189,532, issued February 6, 1940.

It will be understood that in the specification the use of the cooling liquid from a liquid cooled engine is purely illustrative. In Figure 1 I have shown a plane 10 of conventional type provided with wings 11 and 12 in which are mounted the motor nacelles 14 and 15, housing the motors 16 and 17. As shown in Figures 3 and 4 the coolant leaving the motor 17 is introduced by means of pipe 18 to the perforated pipe 19 extending through the leading edge 20 of the wing. The leading edge 20 is a fixed leading edge and is attached at suitable intervals to the wing by means of supports 25 through which the coolant may be returned by means of the pipes 26 to a return pipe 27 through the pipe 28 back into the engine. The leading edge 20 of the wing may be separated into sections by baffles 29 so that condensed liquid or engine coolant will not be free to flow from one end of the wing to the other. In this phase of the invention it will be seen that I have provided a heat transfer means whereby the waste heat from the engine is carried along the leading edge of the wing and there dissipated and, in the particular form shown, a liquid coolant is returned at lower temperature to the engine ready for re-use. This eliminates any necessity for a radiator such as is now in use.

As is clearly shown in Figure 2 the fixed leading edge of the wing is such that the top 30 thereof forms with the surface 31 a Venturi slot 32 thus causing in normal flight a suction through the slot 32 and along the surface 31 and 32. At the trailing edge of the wing is provided a slot 35 which is so designed as to cause neither Venturi suction out of the slot nor impact flow into the slot. Figures 5 to 9 have been drawn to show that this slot may be used in any type of wing. In Figures 5 and 6 Fowler flaps 36 are provided without any interference with the slot 35. In Figure 7 the flap 37 is designed so as not to cause a change in the aforesaid flow characteristics of the slot when the flap angle is changed. This is merely a question of properly positioning the hinge. As shown in Figures 1 slots 32 and 35 may extend the entire length of the wing except where supports 25 are necessary. Since the slot 35 is neutral and a Venturi action is caused by the passage of air over the slot 32 a drop in pressure will be caused within the wing causing a suction through the slot 35 and air will pass through the slot 35 into the opening 40 past the heated inside 41 of the leading edge 20 to be spilled along the surfaces 31 and 32 of the wing. Pivoted at 45 to the lower edge 46 of the wing is a flap 47 adapted to allow air to pass between the point 48 and the pivot 45 through the slot 32.

In operation the mass flow of air at high velocity over the upper surface of the wing causes Venturi suction through the slot 32 with a consequent pressure drop, flap 41 being closed in normal flight position. This pressure drop is transmitted through the wing to the rear slot 35 which is neutral relative to the laminar flow so as to allow neither Venturi suction out of the slot nor impact flow into the slot. The pressure drop will cause a back suction on the boundary layer of the air and on part of the laminar flow into the slot 35. This accomplishes a well known and long desired objective of accelerating and maintaining a smooth laminar flow over the entire wing eliminating any possible tendency toward turbulence and the formation of eddies in the low pressure area on the top of the wing which in turn improves the over-all efficiency of the entire wing.

It will be noted that in normal flight position my device embodies no disturbing deviations from the ideal contours of a basic airfoil thus permitting a minimum drag at high speeds.

When the wing enters upon high angles of attack as for instance in landing where the maximum lift is desired flap 47 moves up into position as shown in Figure 6 simultaneously with the rear flaps 37 moving down or the Fowler flaps 36 being extended. Preferably both would be operated by the same control device. The air flow now enters the front slot from below and is deflected into smooth laminar flow over the top of the wing between fixed slotted leading edge 20 and the slot 32, the back suction on the boundary layer being sustained by Venturi action which now occurs at 51 from the high velocity flow of air past the flap 47.

Where a rear slot such as that shown in Figures 7 and 8 is used the proper location of the pivot or hinge of the rear flap 37 will not affect the neutral condition of the rear slot 35 independently of the nose of the rear flap so that the back suction on the boundary layer, as previously described, continues. The same is true of the conventional flap 50 shown in Figure 9 where the slot 35 is located ahead of the pivot. Back suction on the boundary layer creates an extremely important and valuable effect in that said back suction greatly augments the tendency of the front slot to create a smooth laminar flow over the wing by removing the burbling point, that is by preventing the laminar flow from breaking away from the airfoil proper and causing the eddies which destroy the lift. With this improvement substantially higher angles of attack with the consequent improvement in maximum lift co-efficient will be possible. This will make practical higher wing loadings with a saving in weight, increased speed and improved over-all efficiency of the aircraft.

It should be understood that my invention is not dependent upon the use of waste heat but is useful with or without the element of waste heat dissipation. The broad principle of heating aircraft wings is not claimed by me as this is now being done by some manufacturers as an anti-icing measure. However, in my construction not only is the laminar flow improved and sustained at all practical angles but the waste heat is used and dissipated to best advantage without adding parasitical weight and resistance, the element of anti-icing being extremely important from the standpoint of safe operation.

Not only will my invention be particularly useful with present airfoils but it will be particularly adaptable to thinner airfoils having a sharp leading edge which will be brought into use with high speed high altitude planes such as the jet propulsion type which will require knife edge leading edges and thinner airfoils since it will help to overcome the disadvantageous landing characteristics of such airfoils.

I claim:

1. An airfoil having a leading edge and a trailing edge, a Venturi slot adjacent said leading edge on the upper surface of said wing, a neutral slot adjacent said trailing edge on the upper surface of said wing, a portion of the upper surface of said wing extending downwardly to form a wall defining said Venturi slot and terminating at a spaced distance from the lower surface of said wing, means within said airfoil to connect said slots and a flap adjacent said leading edge on the lower surface of said wing adapted when open, as during high angles of attack, to allow the passage of air from the lower surface of said leading edge through said Venturi slot and forming with the downwardly extending portion of said wing a second Venturi slot.

2. An airfoil having a leading edge and a trailing edge, flaps on said trailing edge, a neutral slot positioned immediately ahead of said flaps, said leading edge being so constructed as to form with the body of said air foil a Venturi slot, means within the airfoil connecting said two slots, a member extending from the top of the wing to a spaced distance from the lower surface of the wing, defining a wall of said Venturi slot and a flap on the lower surface of said leading edge which when open forms with said member extending from the upper wing a second Venturi slot and allows passage of air from the lower surface of said leading edge through said first mentioned Venturi slot during high angles of attack.

3. In an airfoil having a leading and trailing edge a Venturi slot adjacent said leading edge upon the upper surface of said wing, a depending member forming with a wall of the leading edge a passage, said depending member terminating at a spaced distance from the lower surface of said airfoil, a neutral slot adjacent the trailing edge on the upper surface of said airfoil, means within said airfoil connecting said slots, a flap on the lower surface of said wing adjacent said leading edge, said flap being normally closed but adapted to be open during high angles of attack into the passage formed by said depending member and said wall to form with said depending member a second Venturi slot.

4. In an airfoil having a leading and a trailing edge a neutral slot adjacent said trailing edge, a Venturi slot adjacent the leading edge on the upper surface of said wing, said slot being formed with a portion of said airfoil extending downwardly to a spaced distance from the lower surface of said wing to define a passage, means within said airfoil connecting said slots to allow air to normally pass through said neutral slot around said downwardly extending member of the airfoil and out of said Venturi slot, a flap on the lower surface of said airfoil adjacent said leading edge, said flap when opened into said passage forming with said downwardly extending portion a second Venturi slot within said airfoil.

FREDERICK C. MELCHIOR.

REFERENCES CITED

The following references are of record in the file of this patent:

UNITED STATES PATENTS

| Number | Name | Date |
| --- | --- | --- |
| 2,041,786 | Stalker | May 26, 1936 |
| 2,081,963 | Theodorsen et al. | June 1, 1937 |
| 1,783,590 | Simon | Dec. 2, 1930 |
| 1,513,241 | Harding | Oct. 28, 1924 |
| 1,880,967 | Maxwell | Oct. 4, 1932 |
| 2,118,705 | Hall | May 24, 1938 |

FOREIGN PATENTS

| Number | Country | Date |
| --- | --- | --- |
| 584,585 | Germany | Sept. 21, 1933 |
| 189,796 | Great Britain | Nov. 30, 1922 |